C. E. DELANO.
COTTON CHOPPER.
APPLICATION FILED MAR. 21, 1908.

927,128.

Patented July 6, 1909.
3 SHEETS—SHEET 1.

Witnesses

Inventor
Charles E. Delano
by D. A. Gourick
Attorney

C. E. DELANO.
COTTON CHOPPER.
APPLICATION FILED MAR. 21, 1908.

927,128.

Patented July 6, 1909.
3 SHEETS—SHEET 2.

Witnesses

Inventor
Charles E. Delano

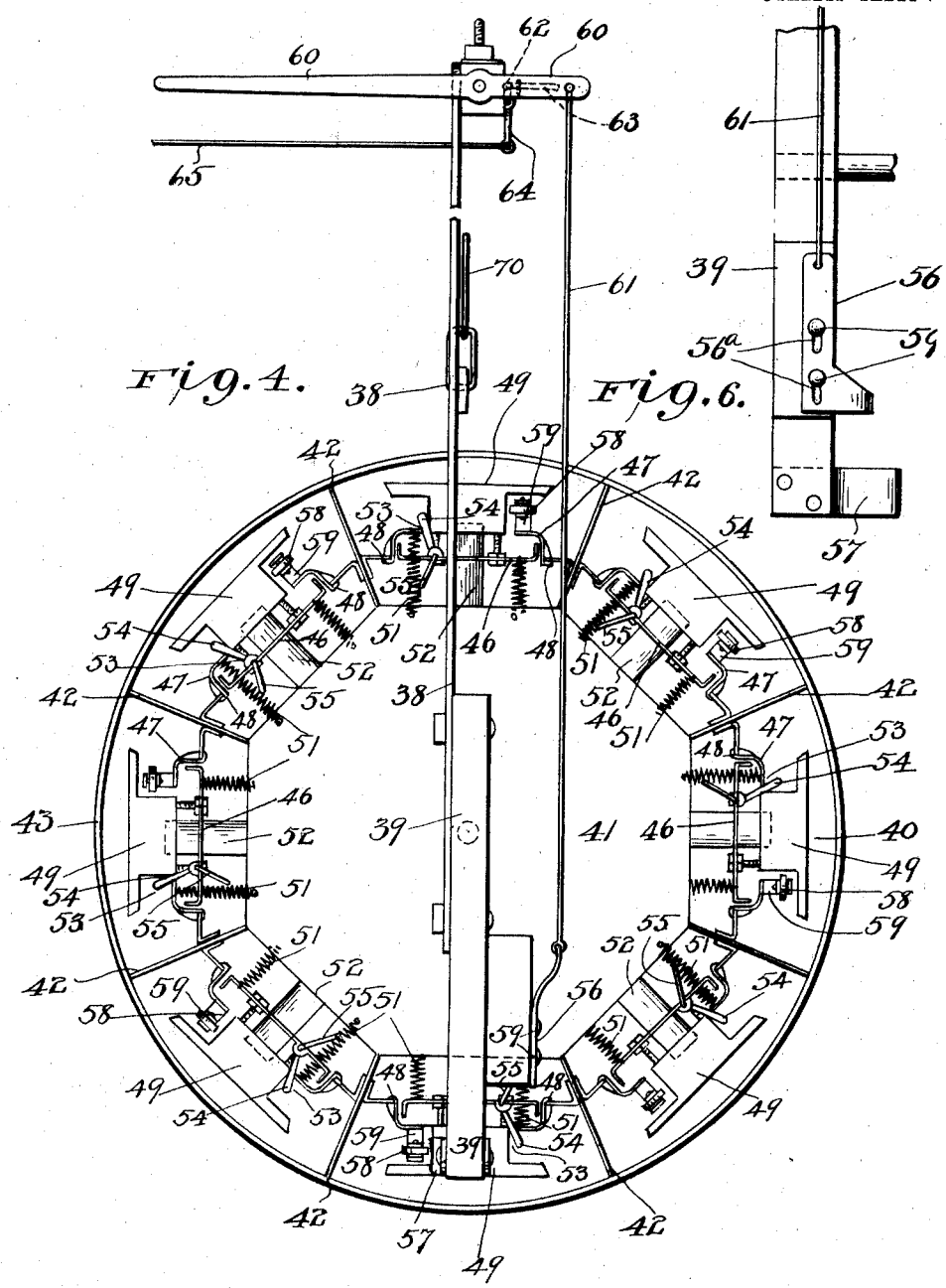

UNITED STATES PATENT OFFICE.

CHARLES E. DELANO, OF FORREST CITY, ARKANSAS.

COTTON-CHOPPER.

No. 927,128.

Specification of Letters Patent.

Patented July 6, 1909.

Application filed March 21, 1908. Serial No. 422,541.

*To all whom it may concern:*

Be it known that I, CHARLES E. DELANO, a citizen of the United States, residing at Forrest City, in the county of St. Francis and State of Arkansas, have invented certain new and useful Improvements in Cotton-Choppers, of which the following is a specification.

My invention relates to devices for cutting out growing plants and has for its object the provision of an improved machine for the purpose stated that is attachable to a wheeled cultivator so that the thinning of the plants can be carried on simultaneously with the cultivation of the remaining plants.

My invention involves novel constructions and combinations of parts particularly pointed out and described hereinafter and will be found illustrated in the accompanying drawings in which—

Figure 1:
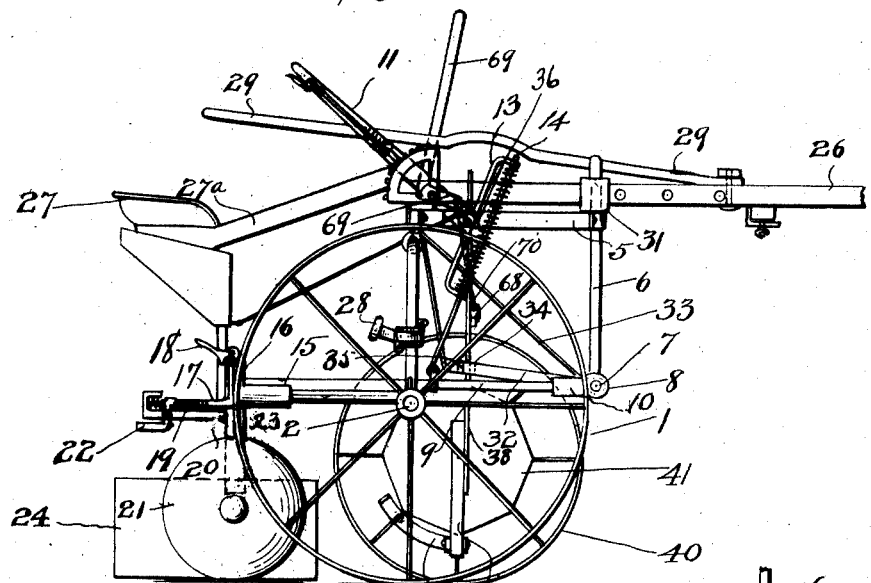
Figure 7:
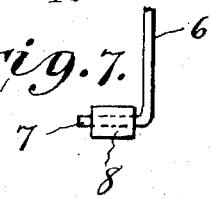
Figure 2:
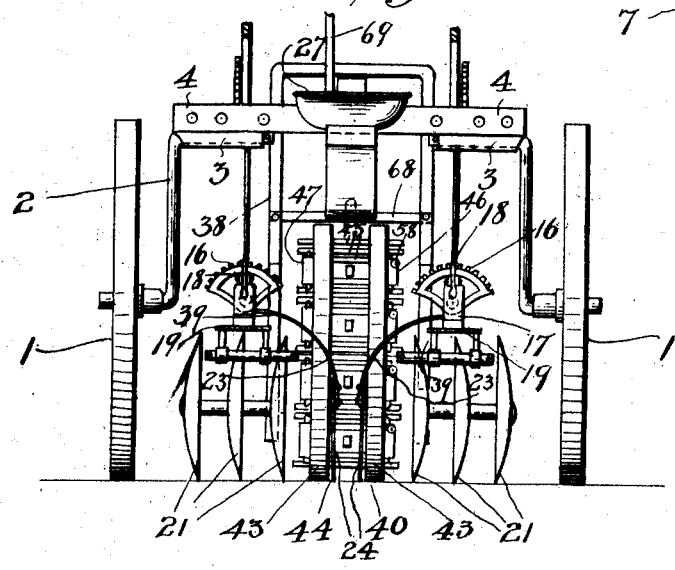
Figure 5:
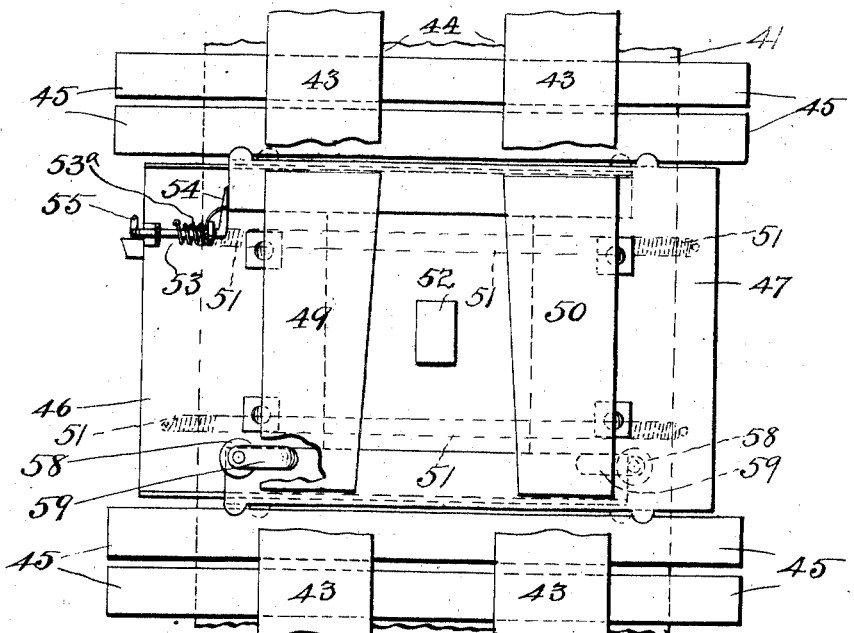
Figure 3:
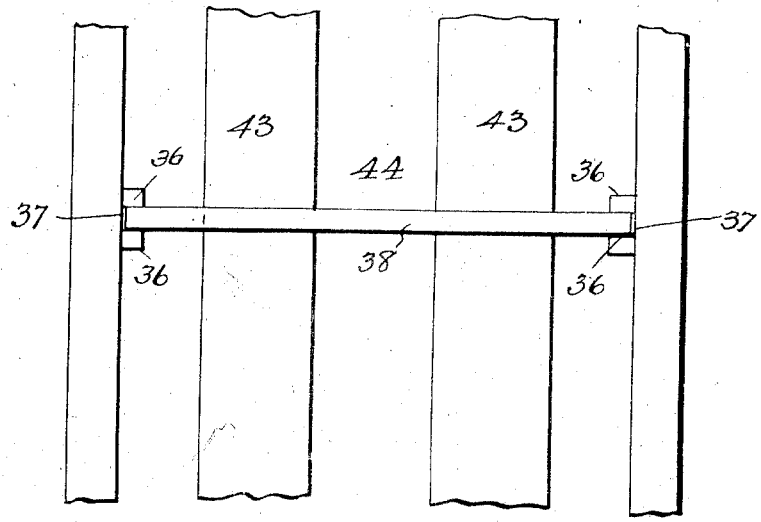

Figure 1 is a side view of a disk cultivator showing my improved chopper attached thereto, Fig. 2, a rear view of said cultivator and chopper, Fig. 3, a plan view of a fragment of the machine showing the means for mounting the chopper, Fig. 4, a side view of the chopper, Fig. 5, a detail view of one of the chopping sections, Fig. 6, a view of the lower end of one of the arms supporting the chopper showing the devices for operating the chopping blades, and Fig. 7, a fragmental view of one side of the front frame of the disk cultivator.

In the drawings similar reference characters indicate corresponding parts in all the views.

As stated above my improved chopper is attachable to a wheeled cultivator of the type illustrated in Figs. 1 and 2 in which 1 indicates the traction wheels journaled on angular axles 2 having their ends secured in sleeves 3 mounted on cross-bar 4, forming an axle with an upwardly extending U-shaped portion. The ends of the axles may be adjusted in the sleeves 3 to permit the width of draft to be regulated as desired, any form of clamp to secure the ends of the axles in said sleeves being provided.

5 indicates a frame secured to cross-bar 4 and extending toward the front on a horizontal plane.

6 indicates a vertical U-shaped frame secured to the front of frame 5 and having its ends turned horizontally to form stub shafts 7, on each end of which is journaled a sleeve 8 having a rearwardly extending bar 9 secured in a socket 10 thereon.

11 indicates levers fulcrumed on brackets 12, mounted on cross-bar 4, and secured by means of yoke 13 to rods 14 pivotally secured to bars 9.

15 indicates a sleeve secured adjacent to the rear end of each bar 9 and having a segmental rack 16 thereon.

17 indicates a frame revolubly mounted on the end of each bar 9 and having a spring pawl 18 to engage the teeth of rack 16 to adjust the frame 17. The rear end of each frame 17 is formed with a segmental rack 19.

20 indicates a frame mounted on frame 17 and having cultivator disks 21 revolubly secured therein.

22 indicates a spring pawl on each frame 20 that engages rack 19 to adjust the frame relative to the direction of the draft.

23 indicates a spring arm secured to each frame 17 and having a plate 24 secured to its free end that acts as a fender, running along on each side of the row of plants to prevent the disks from throwing the earth on them.

26 indicates the draft beam secured to cross-bar 4 and 27 the seat for the operator secured to arms 27$^a$ extending rearwardly from draft beam 26.

28 indicates foot rests for the operator's feet adjustably secured to the upright portion of the axles 2, and 29 a hand lever pivotally secured to draft beam 26.

The construction of cultivator above described and illustrated in the drawings is that of a machine now on the market, manufactured by the Rock Island Plow Company, Rock Island, Ill., and known as "The Dictator Cultivator."

In order to accommodate my improved cotton chopper attachment to be hereinafter described I have changed the position of the braces for the U-shaped frame and in the drawings show the changes in which 32 and 33 indicate said braces connecting the U-shaped frame 6 and cross bar 4, the braces 32 being angular as shown and provided with cleats 34 spaced apart to form guideways 35, and 36 indicates other cleats secured to the inner sides of U-shaped frame 5 and spaced apart to form other guideways 37 in vertical alinement with guideways 35.

38 indicates an inverted U-shaped frame slidably mounted in guideways 35 and 37. The free ends of frame 38 are secured to upright bars 39 between which is journaled the chopping roller 40. Roller 40 consists of a drum 41 having rods 42 extending outwardly therefrom to which are secured the two rings 43, spaced apart to form a slot 44, the rings 43 running one on either side of the row of plants.

45 indicates slides secured to rods 42 and extending transversely of the roller, said guides being arranged in pairs and having their edges extending toward each other. The chopping devices consist of frames 46 and 47 slidably mounted on slides 45 by means of clips 48, said frames 46 and 47 having chopping blades 49 and 50 secured thereto.

51 indicates springs secured to each frame 46 or 47 and to the drum 41 which normally hold the frames 46 and 47 so that the edges of chopping blades 49 and 50 overlap each other acting in the nature of a pair of shears. Posts 52 are secured to the drum 41 between each of the frames 46 and 47 to engage said frames and limit the movement thereof under the impulse of the springs 51 and to also insure centering of the blades 49 and 50 between the rings 43.

53 indicates a catch journaled on each frame 46 and having an angular upright portion 54 to engage the end of frame 47 and hold the two frames so that the blades 49 and 50 are separated and against the impulse of springs 51.

55 indicates an angular extension on the other end of catches 53 that are engaged by the lower end of plate 56 slidably mounted on one of the bars 39.

53ª indicates springs to hold the catches 53 normally in position to engage the end of frame 47 as stated.

When in its lowermost position the plate 56 engages angular extension 55 and swings the catch so that the end 54 is out of engagement with the end of frame 47 and the frames 46 and 47 are released to the action of springs 51 which slide said frames on guides 45 so that the cutting blades 49 and 50 are brought together and any plants that may be engaged thereby will be either cut off or pulled out of the ground.

57 indicates arms secured to the lower end of each bar 39, extending backwardly therefrom and slanting inwardly toward the chopping roller 40 to engage rollers 58 journaled on arms 59 secured to frames 46 and 47. The function of the arms 57 engaging rollers 58 is to push frames 46 and 47 back against the impulse of springs 51 so that the frames resume the positions occupied before being released to the action of the springs as stated and the catch 53 engages the end of frame 47. The plate 56 has vertical slots 56ª therein to receive pins 59 secured to bar 39.

60 indicates a lever fulcrumed on the side of U-shaped frame 38 and having one arm connected with plate 56 by means of rod 61 so that the plate may be raised by the operator whenever the plant growth is so thin that no plants need be cut out.

When in a raised position the plate 61 does not engage the extension 55 on catch 53 so that the frames 46 and 47 remain inactive and the chopping blades 49 and 50 do not operate.

68 indicates a cross bar secured to the sides of frame 38 and 69 indicates a bell crank lever fulcrumed on cross-bar 4 and having one of its arms connected to cross-bar 68 by means of rod 70. This construction admitting of raising the frame 38 and chopping roller 40 when turning the machine at the ends of rows and in going to and from the field.

Various changes in the proportions and construction of my device may be resorted to without departing from the scope of my invention and I do not therefore limit myself to the construction shown and described.

Having thus described my invention what I claim is—

1. In a cotton chopper, a roller, frames slidably mounted in pairs on said roller, springs to actuate said frames, chopping blades secured to said frames, means to hold said frames stationary against the action of said springs, and means to release the frames to the action of the springs.

2. In a cotton chopper, a roller, frames mounted in pairs on said roller and adapted to reciprocate transversely of the roller, springs to actuate said frames, chopping blades secured to said frames, means to hold said frames against the action of said springs, and means to release the frames to the action of the springs.

3. In a cotton chopper, a roller, frames slidable in pairs transversely of the roller, springs to actuate said frames, chopping blades secured to said frames, means to hold said frames stationary against the action of said springs, means to release the frames to the action of the springs, and means to return the frames to the stationary position.

4. In a cotton chopper, the chopping roller comprising a cylindrical portion, rods extending radially from the periphery of said cylindrical portion, rings secured to the outer ends of said rods and spaced apart, guides secured to said rods, frames mounted on said guides to slide transversely of the roller, chopping blades secured to said frames, and means to actuate the frames.

5. In a cotton chopper, the chopping roller comprising a cylindrical portion, rods extending radially from the periphery of said cylindrical portion, rings secured to the outer ends of said rods and spaced apart, guides secured to said rods, frames mounted on said guides to slide transversely of the roller, chopping blades secured to said frames, springs secured to the frames and the cylindrical portion to actuate said frames, and means to move said frames against the resistance of said springs.

6. In a cotton chopper, the chopping roller comprising a cylindrical portion, rods extending radially from the periphery of said cylindrical portion, rings secured to the outer ends of said rods and spaced apart, guides secured to said rods, frames mounted on said guides to slide transversely of the roller, chopping blades secured to said frames, springs secured to the frames, and the cylindrical portion to actuate the frames, means to move the frames against the resistance of said springs and hold them in a stationary position, and means to release the frames to the action of the springs.

7. In a cotton chopper, the chopping roller comprising a cylindrical portion, rods extending radially from the periphery of said cylindrical portion, rings secured to the outer ends of said rods and spaced apart, guides secured to said rods, frames mounted on said guides to slide transversely of the roller, chopping blades secured to said frames, springs secured to the cylindrical portion and to the frames to actuate them, means to move the frames against the resistance of said springs, catches to hold the frames against the action of the springs, and means to release the frames to the action of the springs.

8. In a cotton chopper, the chopping roller comprising a cylindrical portion, rods extending radially from the periphery of said cylindrical portion, rings secured to the outer ends of said rods and spaced apart to form a slot therebetween, guides secured to said rods, frames mounted in pairs on the guides to slide transversely of the roller, chopping blades secured to the frames and adapted to reciprocate in the slot between the rings, and means to actuate the frames.

9. In a cotton chopper, the chopping roller comprising a cylindrical portion, rods extending radially from the periphery of said cylindrical portion, rings secured to the outer ends of said rods and spaced apart to form a slot therebetween, guides secured to said rods, frames mounted in pairs on the guides to slide transversely of the roller, chopping blades secured to the frames and adapted to reciprocate in the slot between the rings, springs secured to the cylindrical portion and to the frames to actuate them, and means to slide said frames against the resistance of the springs.

10. In a cotton chopper, the chopping roller comprising a cylindrical portion, rods extending radially from the periphery of said cylindrical portion, rings secured to the outer ends of said rods, and spaced apart to form a slot therebetween, guides secured to said rods, frames mounted in pairs on the guides to slide transversely of the roller, chopping blades secured to the frames and adapted to reciprocate in the slot between the rings, springs secured to the cylindrical portion and to the frames to actuate them, means to move the frames against the resistance of said springs and hold them in a stationary position, and means to release the frames to the action of the springs.

11. In a cotton chopper, the chopping roller comprising a cylindrical portion, rods extending radially from the periphery of said cylindrical portion, rings secured to the outer ends of said rods and spaced apart to form a slot therebetween, guides secured to said rods, frames mounted in pairs on the guides to slide transversely of the roller, chopping blades secured to the frames and adapted to reciprocate in the slot between the rings, springs secured to the cylindrical portion and to the frames to actuate them, means to move the frames against the resistance of said springs, catches to hold the frames against the action of the springs, and means to release the frames to the action of the springs.

12. In a cotton chopper, a wheeled truck, an inverted U-shaped frame mounted on said truck, the chopper journaled between the arms of said frame, said chopper comprising a cylindrical portion, rods extending radially from the periphery of said cylindrical portion, rings secured to the outer ends of said rods and spaced apart to form a slot therebetween, guides secured to said rods, frames mounted in pairs on the guides to slide transversely of the roller, chopping blades secured to the frames and adapted to reciprocate in the slot between the rings, arms secured to the ends of said U-shaped frame and slanting inwardly to engage the chopper frames and move them against the resistance of said springs, catches to hold the frames from movement under the impulse of said springs, and a plate slidably mounted on the U-shaped frame to engage the catches to release the frames to the action of the springs.

In testimony whereof I hereto affix my signature in the presence of two witnesses.

CHARLES E. DELANO.

Witnesses:
 JNO. J. JONES,
 J. H. TIPTON.